N. HOFSTAD.

CONTROL DEVICE.

APPLICATION FILED FEB. 28, 1919.

Reissued June 24, 1919. 14,671.

Inventor

Nels Hofstad

By Thomas H. Ferguson

Attorney.

UNITED STATES PATENT OFFICE.

NELS HOFSTAD, OF CHICAGO, ILLINOIS, ASSIGNOR TO JOHNSON SERVICE COMPANY, A CORPORATION OF WISCONSIN.

CONTROL DEVICE.

14,671. Specification of Reissued Letters Patent. Reissued June 24, 1919.

Original No. 1,283,769, dated November 5, 1918, Serial No. 249,486, filed August 12, 1918. Application for reissue filed February 28, 1919. Serial No. 279,907.

*To all whom it may concern:*

Be it known that I, NELS HOFSTAD, a citizen of the United States, and a resident of the city of Chicago, county of Cook, and State of Illinois, have invented certain new and useful Improvements in Control Devices, of which the following is a full, true, and exact description, reference being had to the accompanying drawings, forming part of this specification.

The present invention relates to devices such as are used in the heating, ventilating and air conditioning arts, in performing various operations in response to changes in the condition of the atmosphere or other medium to be controlled. Such devices include instruments responsive to temperature changes, called thermostats, and instruments responsive to humidity changes, called humidity regulators. The invention has to do principally with the simplification of the structure of such devices. In such devices, air under pressure is usually employed as an actuating medium. The air commonly acts upon a diaphragm which coöperates with valves and passages to supply air to the working point and to cut it off, as may be required by the changes in the atmosphere or other medium which is to be controlled. The air under pressure is received by the instrument from a suitable source of supply and controlled in its passage to a suitable delivery passage and the work. A valve controlling an opening between the receiving and delivery passages operates to supply or cut off the air under pressure and at the same time close or open an exhaust from the delivery passage. One object of my invention is to perform these necessary functions by an instrument having only one diaphragm. Another object is to simplify prior structures by rendering more of the parts fixed and immovable and thereby simplifying the construction. This latter object applies especially to the exhaust passage and its control. These various objects and features of the invention will be more fully understood upon reference to the following detailed description taken in connection with the accompanying drawings, while the scope of the invention will be pointed out in the appended claims.

Figure 1:
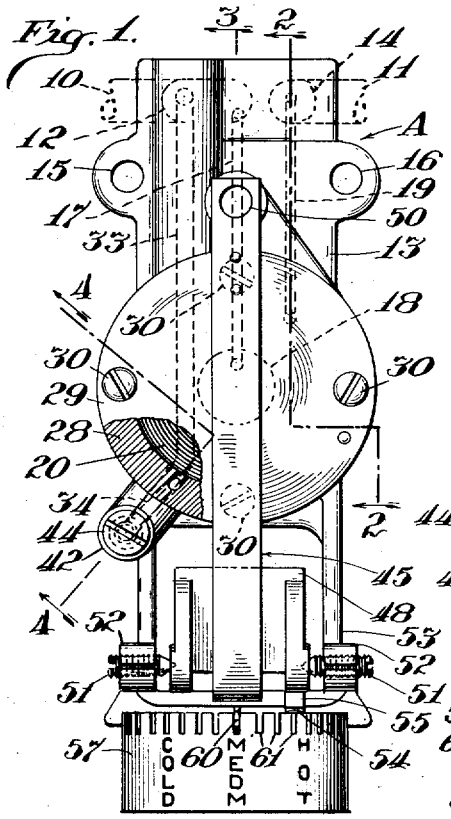
Figure 2:
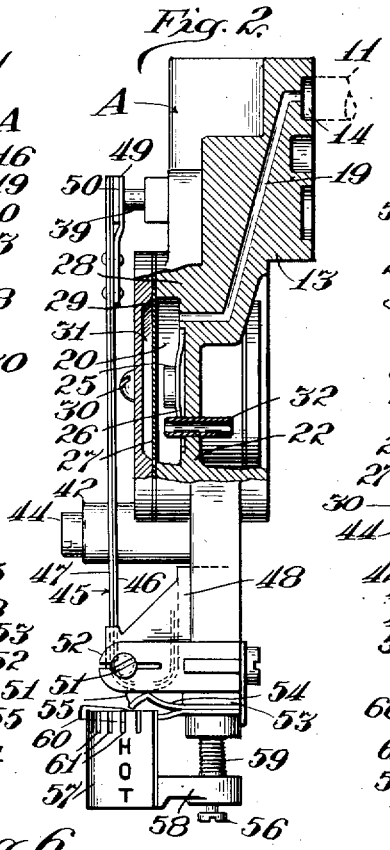
Figure 3:
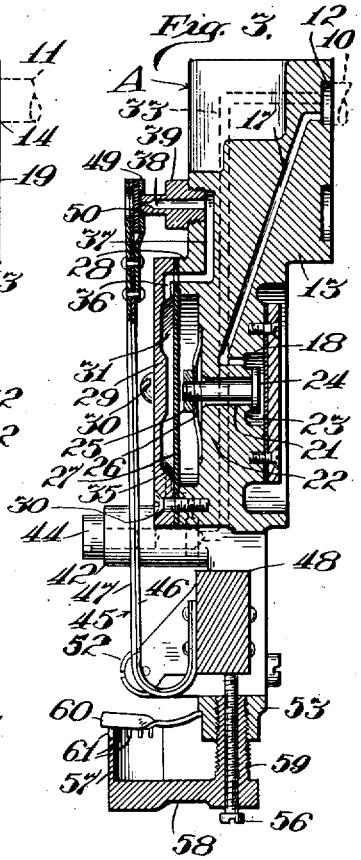
Figure 4:
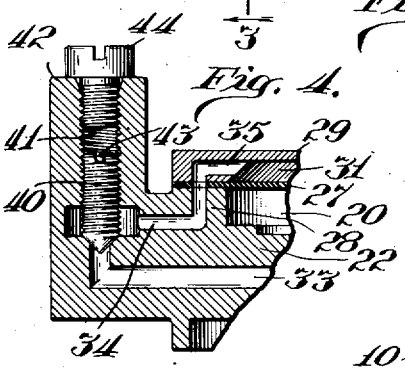
Figure 6:
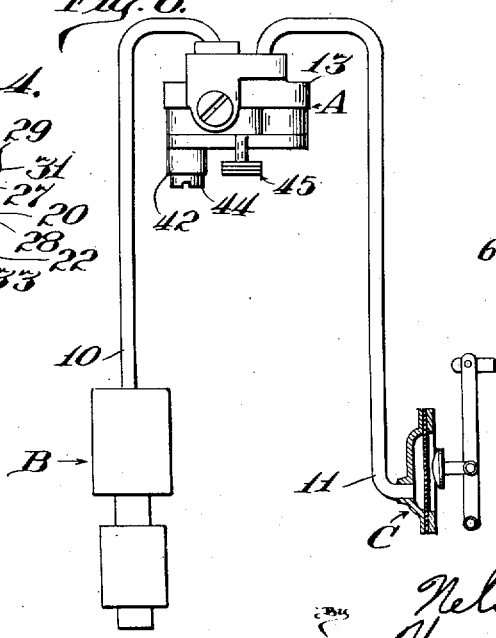
Figure 5:
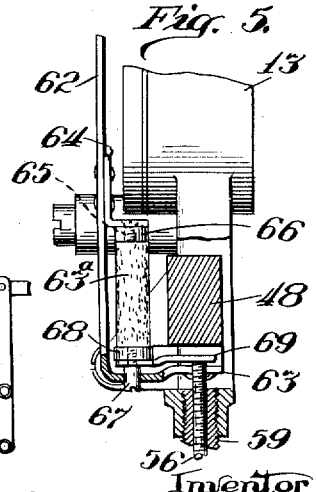

In said drawings: Figure 1 is a front elevation of a temperature responsive instrument constructed in accordance with the present invention; Fig. 2 is a side elevation of the same, parts being shown in section taken on a plane indicated by the line 2—2 of Fig. 1; Fig. 3 is a central vertical section of the same, the plane of section being indicated by the line 3—3 of Fig. 1; Fig. 4 is a section of portion of the instrument illustrating the restricting needle valve and associated passages by which the supply of air to the diaphragm is controlled, the plane of section being indicated by the line 4—4 of Fig. 1; Fig. 5 is a partial sectional elevation of a humidity responsive element which may be used in place of the temperature responsive element of the other figures; and Fig. 6 is a general view of the thermostat or temperature responsive instrument, shown in operative relation to a compressor and an air pressure motor. Throughout these views like characters refer to like parts.

Referring to the drawings in detail, and more particularly at first to the general view of Fig. 6, the thermostat A is positioned between the source of compressed air supply, here shown as a compressor B, and the work, here an air pressure motor C which may be used to operate a valve, damper, or other mechanism, as desired. The air supply passage from the compressor C to the instrument A is provided by the pipe 10, while the delivery passage is provided by the pipe 11. The first of these pipes, namely pipe 10, communicates with the elongated recess 12 in the upper body portion 13 of the frame of the thermostat, and the latter, that is pipe 11, communicates with the smaller recess 14. These pipe connections are commonly made through a mounting plate of the type illustrated in United States Patent No. 1,109,993 to C. F. Johnson, granted Sept. 8, 1914. The screw openings 15 and 16 in the body portion 13 of the instrument are provided for this purpose. But such connections may be made in any suitable way.

With the pipes 10 and 11 thus connected, the supply pipe 10 communicates through recess 12 with a passage 17 terminating in a supply passage or chamber 18. In a similar way the delivery pipe 11 communicates through recess 14 with a passage 19 terminating in a delivery passage or chamber 20.

An intermediate opening 21 connects the chambers 18 and 20. The opening 21 extends through the wall 22 and is provided with a valve seat 23. A valve 24 coöperates with the seat 23 to open and close the intermediate opening 21. The stem of the valve 24 extends through the opening 21 and is provided at its forward end with a nut 25 which bears against the leaf spring 26. The stem of the valve extends through an opening in the center of the spring 26 and the nut is screwed on to the end of the stem. The outer ends of the spring 26 bear against the face of the wall 22. The construction of these parts is such that normally the spring 26 holds the valve 24 closed upon its seat 23 and air from the supply chamber 18 cannot pass to the delivery chamber 20 and out through the passage 19 and pipe 11 to the motor C. But it will be seen that if the valve 24 be moved against the tension of the spring 26, then the passage 21 will be opened so as to allow the passage of compressed air through the delivery pipe 11 to the work. To bring about this movement of valve 24 against the tension of spring 26, the instrument is provided with a diaphragm 27.

The diaphragm 27, which is composed of any suitable flexible substance, preferably patent leather, forms the forward wall of the delivery chamber 20. It is secured at its periphery to an annular projection 28 by means of a covering cap 29 and securing screws 30. The cap 29 is cut away on its inner surface so as to provide a chamber 31 to which air may be supplied or from which it may be exhausted, to control the movements of the diaphragm 27. Normally there is a slight clearance between the diaphragm and the end of the stem of valve 24. There is also a similar clearance between the diaphragm 27 and the adjacent end of fixed exhaust tube 32 which provides a fixed and immovable exhaust opening between the delivery chamber 20 and the atmosphere. Whenever the diaphragm 27 is moved so as to engage the stem of valve 24, it also closes the exhaust passage through tube 32, since the adjacent end of the exhaust opening lies in the path of travel of the diaphragm. On the other hand, whenever diaphragm 27 is moved away from valve 24, exhaust port 32 is opened. In this way the diaphragm either admits a supply of air to the delivery connections and cuts off the exhaust therefrom, or it opens the exhaust and cuts off the supply.

Now the control of diaphragm 27 by chamber 31 is brought about by holding compressed air in said chamber to open valve 24 and close exhaust 32 or by allowing air to escape from said chamber and thus leave valve 24 closed, or free to close, and said exhaust open. For this purpose a restricted supply leads from supply pipe 10 to chamber 31 and a more rapid exhaust extends from said chamber to the atmosphere. The former of these may be traced from pipe 10 through recess 12, passages 33, 34 and 35 to chamber 31, and the latter from chamber 31 through passages 36, 37 and 38 to atmosphere. Passages 35 and 36 are found in opposite sides of cap 29; passages 33, 34 and 37 in the portion 13 of the body of the instrument, and passage 38 in a nipple 39 screwed into a threaded opening in the upper portion of face of the instrument body. A restricting valve 40 is interposed between the passages 33 and 34 and when in set position allows a small amount of compressed air to leak through into chamber 31. The valve 40 is screw-threaded into a threaded opening 41 formed in a projection 42 of the body portion 13. The valve 40 is provided with a kerf 43 and may be readily set by a screw-driver or other suitable tool passed into the opening 41. A cap screw 44 screwed into the same opening 41 prevents interference with the position of the restricting screw 40. The diaphragm 27 is, of course, provided with two openings, one in line with passages 34 and 35 and the other in line with passages 36 and 37. The exhaust opening through passages 36, 37 and 38 is of larger minimum capacity than the supply opening about the restricting valve 40. Consequently, when exhaust port or passage 38 is closed, air under pressure will accumulate in chamber 31 and move diaphragm 27 to close exhaust port 32 and open supply valve 24. On the other hand, when port 38 is open, the air in chamber 31 will escape more rapidly than it can enter around the valve 40 and so supply valve 24 will be closed and exhaust port 32 opened. The proportion and arrangement of parts is such that the diaphragm, when moving under the accumulation of pressure in chamber 31, engages port 32 before it engages valve 24 and thus closes the former before opening the latter. In its movement in the opposite direction, the diaphragm allows valve 24 to close before it opens exhaust port 32.

In order to control the opening and closing of port 38, an atmospherically responsive element is provided. This may be the thermostatic element of Figs. 1, 2, 3 and 6, or the hygrometric element of Fig. 5. The thermostatic element, designated 45, is composed of two strips of metal having different coefficients of expansion, as, for example, an inner strip 46 of iron and an outer strip 47 of brass. These are secured together throughout their length and the composite strip is bent back upon itself near its lower end and secured to the center of the weighted saddle block 48. The upper end of the element 45 has an additional strip 49 secured to it and this strip is offset so as to form a pocket for the valve seat 50 which is preferably a small sheet of celluloid which coöperates with the pointed end of the nipple 39 through which the exhaust passage 38 extends. The latter terminates in a small port as shown. This, however, as before noted, is large enough in cross sectional area to allow air to escape faster than it can enter around restricting valve 40. To allow the seat 50 to fit the port well, the strips 46, 47 and 49 are apertured as illustrated.

The saddle block 48 has its depending portions retained by pivots 51 threaded through threaded openings in lugs 52 extending forward from the frame portion 53 of the instrument. The lugs 52 are slotted so as to exert a resilient clamping action upon the pivot screws 51. A leaf spring 54 is secured at one end to a horizontal member of the frame portion 53. The free end of this spring is formed with a hump which coacts with an angular projection 55 on the saddle 48. When the parts are in the position illustrated, the spring bears against the rear of the projection 55 and holds the saddle yieldingly against the end of the adjusting screw 56. When the upper end of the thermostatic strip 45 is drawn outward a considerable distance by hand, then the forward side of the projection 55 engages the top of the spring 54 and the latter yieldingly holds the strip away from nipple 39 in its outwardly extending position. The spring 54, by pressing the weighted saddle 48 against the top of screw 56, augments the action of the weight of the saddle.

For adjusting the position of screw 56 and indicating its adjustment, an arcuate dial 57 is provided. This dial is secured to the outer end of an arm 58 having an exteriorly and interiorly threaded hub 59. The exterior thread on the hub engages the threads of a threaded opening in the horizontal member of the frame 53. The interior thread of the hub 59 is engaged by the threads of the adjusting screw 56. With this arrangement it will be seen that screw 56 will be slightly raised and lowered by moving dial 57 back and forth. Its movement rotates hub 59 and causes it to screw into or out of the threaded opening in the frame and thus to raise or lower screw 56 by a slight amount. A resilient catch 60 is fixed at one end to the frame 53 and its free end is adapted to pass into notches 61 formed in the upper edge of the dial 57. Suitable legends, as "Cold", "Med'm", and "Hot" on the face of the dial indicate the results which follow a shifting of the dial which brings the catch, and pointer, 60 adjacent these words.

When the instrument is provided with a hygrometric element, it may be constructed as illustrated in Fig. 5. There a single metal strip 62 carries the valve at its top. It is bent laterally at its lower end so as to provide a horizontal portion 63 which is secured to the under side of the saddle 48. A bracket 64 secured to the inner face of the strip 62 forms an abutment for the hygrometric element 63ª which in the present case is a small cylinder of wood cut crosswise of the grain. It is provided with a metal cap at each end. A screw 65 extends through a countersunk hole in bracket 64 into threaded engagement with the upper cap 66. Similarly a screw 67 is screwed into the lower cap 68 through an opening in the arm 69. The latter is firmly held between the end of the cap 68 and the square shoulder of the head of the screw 67 which extends through an opening in the adjacent portion of the portion 63 of the strip 62. The rear end of the arm 69 bears against the top of the adjusting screw 56. Varying the position of the screw 56 tends to move the upper free end of the strip 62 toward or from the nipple 39 and thus varying the pressure upon the latter exerted by the strip or actually displacing the strip relatively to the nipple. Expansion or contraction of the element 63ª slightly opens and closes the port 38 and brings about the required control of the diaphragm as previously described. In the case of the hygrometric control, the dial, of course, is differently marked than when the control is a temperature control. Thus, "Wet" and "Dry" replace "Cold" and "Hot".

Obviously, although air under pressure is commonly employed in instruments of the kind herein described for the purpose of supplying the working force and controlling the diaphragm, yet other fluids of various kinds might be used for this purpose. For convenience, however, I have used the term "air" as generically representative of such equivalents.

What I claim as new and desire to secure by Letters Patent of the United States, is:

1. A control device responsive to changes in condition of the medium to be controlled, comprising fixed structural parts providing a fluid-pressure supply passage and a delivery passage connected by an intermediate opening and having a fixed exhaust passage connecting said delivery passage to the atmosphere; a valve for controlling said intermediate opening, said valve being separate and distinct from said exhaust passage; an expansible member positioned in relation to said valve and said exhaust passage and operative to engage said valve and the port of said exhaust passage, to open said valve and to close said port; means for supplying and exhausting said fluid-pressure to operate said expansible member; and an element responsive to said changes to control said supplying and exhausting means.

2. A control device of the character described comprising fixed structural parts providing fluid-pressure supply and delivery passages connected by an intermediate opening, and an immovable exhaust passage leading from said delivery passage to the atmosphere; a valve for controlling said intermediate opening, said valve being separate and distinct from said exhaust passage; a spring tending to close said valve; a diaphragm secured at its periphery and free near its center to engage both said valve and the port of said exhaust passage, in the former case to coöperate with said spring to open and close said valve, and in the latter case to coöperate with said exhaust port to close and open said exhaust passage; means for supplying and exhausting fluid-pressure to operate said diaphragm; and means responsive to changes in the condition of surrounding medium to control said pressure supplying and exhausting means.

3. A control device of the character described comprising fixed structural parts providing main air supply and delivery passages and a main immovable exhaust passage leading from said delivery passage to the atmosphere; a wall between said main supply and delivery passages having an opening provided with a valve seat on the supply passage side of said opening; a valve coöperating with said seat and having a stem extending through said intermediate opening, said valve being separate and distinct from said exhaust passage; a spring acting between said stem and wall to seat said valve when unrestrained; a diaphragm on the delivery passage side of said valve, fixed at its periphery and in position to engage said stem to actuate said valve in opposition to said spring and to close the delivery passage end of said exhaust passage when said diaphragm is in engagement with said valve stem; said structural parts forming also an auxiliary chamber on the opposite side of said diaphragm from said valve, connected with said supply passage by a restricted passage and to atmosphere by an auxiliary exhaust opening having a larger minimum cross sectional area than said restricted passage; and an element for opening and closing said auxiliary exhaust opening in response to changes in the condition of the surrounding medium.

4. A control device of the character described comprising a body portion having a fluid-pressure supply passage and a delivery passage connected by an intermediate opening and having an exhaust passage connecting said delivery passage to the atmosphere, said supply, delivery and exhaust passages and said opening being formed in said body portion; a valve for controlling said intermediate opening; means responsive to pressure variations to directly engage said valve and the port of said exhaust passage to actuate said valve and to open and close said port; and means for effecting such pressure variations in response to changes in the condition of the surrounding medium.

5. A control device of the character described comprising a body portion having a fluid pressure supply passage and a delivery passage connected by an intermediate opening, a valve for controlling such opening, said body portion having also an exhaust passage connecting said delivery passage to the atmosphere, said exhaust passage being remote from said opening, means responsive to pressure variations to directly engage said valve and the port of said exhaust portion to actuate said valve and to open and close said port, and means for effecting such pressure variations in response to changes in the condition of the surrounding medium.

In testimony whereof, I have hereunto subscribed my name this 19th day of February, A. D. 1919.

NELS HOFSTAD.